(12) United States Patent
Swaroop et al.

(10) Patent No.: US 7,304,959 B1
(45) Date of Patent: Dec. 4, 2007

(54) UTILITY BASED FILTERING MECHANISM FOR PMTU PROBING

(75) Inventors: Ashish Swaroop, Uttar Pradesh (IN); Ramachandran Nirmala Alex, Tamil Nadu (IN)

(73) Assignee: Novell, Inc., Provo, UT (US)

( * ) Notice: Subject to any disclaimer, the term of this patent is extended or adjusted under 35 U.S.C. 154(b) by 967 days.

(21) Appl. No.: 10/408,295

(22) Filed: Apr. 7, 2003

(51) Int. Cl.
   *H04L 12/26* (2006.01)
(52) U.S. Cl. .................. 370/252; 370/233; 370/389
(58) Field of Classification Search ............ 370/233, 370/234, 472
   See application file for complete search history.

(56) References Cited

U.S. PATENT DOCUMENTS

| | | | |
|---|---|---|---|
| 5,425,023 | A | 6/1995 | Haraguchi et al. |
| 5,892,753 | A | 4/1999 | Badt et al. |
| 5,959,974 | A | 9/1999 | Badt et al. |
| 6,212,190 | B1 | 4/2001 | Mulligan |
| 7,103,674 | B2* | 9/2006 | Brown et al. ............... 709/234 |
| 2003/0048793 | A1* | 3/2003 | Pochon et al. .............. 370/401 |
| 2003/0076850 | A1* | 4/2003 | Jason, Jr. .................... 370/414 |
| 2003/0185208 | A1* | 10/2003 | Lee et al. ................... 370/389 |
| 2003/0187975 | A1* | 10/2003 | Brown et al. ............... 709/224 |
| 2004/0090922 | A1* | 5/2004 | Jason et al. ................. 370/252 |
| 2005/0117577 | A1* | 6/2005 | Fichou et al. ............... 370/389 |

OTHER PUBLICATIONS

McCann, Deering & Mogul, Network Working Group, RFC 1981, Path MTU Discovery for IP version 6, Aug. 1996, pp. 1-15.
Mogul & Deering, Network Working Group, RFC 1191, Path MTU Discovery, Nov. 1990, pp. 1-19.

* cited by examiner

*Primary Examiner*—Chi Pham
*Assistant Examiner*—Kevin Mew
(74) *Attorney, Agent, or Firm*—King & Schickli, PLLC (57) ABSTRACT

A method and mechanism for determining when to transmit a probe packet to detect increases in path maximum transmission unit (PMTU) in a network having a host and a target interconnected by the network. Calculate a utility variable corresponding to a number of packets to be transmitted from the host to the target which are greater than a predetermined amount of a known PMTU for the target. When the utility variable is greater than a predetermined utility threshold, sending instructions to the host to send a probe packet to detect increases in PMTU for the target. Storing the previous state of the internet path with respect to PMTU in a variable PPMTU and tracking it during decreases so that a restoration of the PMTU can be verified by sending probes. PMTU is treated as a resource which is either fully or partially used by an application.

18 Claims, 6 Drawing Sheets

FIG. 1

| NO. | DESTINATION | GATEWAY | UCOUNT | STATE | LPMTU | PPMTU |
|---|---|---|---|---|---|---|
| 1 | D1 | R1 | 2000 | S | 1800 | 1500 |
| 2 | D2 | R1 | 3000 | A | 2000 | 1280 |
| 3 | D3 | R1 | 4000 | A | 1280 | 1280 |
| 4 | D4 | R2 | 2500 | P | 4024 | 2048 |
| 5 | D5 | D5 | 1500 | A | 4000 | 4000 |

UTILITY BASED FILTERING MECHANISM FOR PMTU PROBING

FIELD OF THE INVENTION

Embodiments of the present invention relate generally to network communications and, more specifically, to methods and systems for determining when to transmit a probe packet to detect increases in path maximum transmission unit (PMTU) in the network.

BACKGROUND OF THE INVENTION

The introduction and increasingly wide usage of computers in the past 30 years has made heretofore unavailable information increasingly accessible. This information or data explosion has increased exponentially in the past decade with the advent of personal computers and the large linking of computers via local and wide area networks. These computers or workstations coupled with each other can transmit many types of information from one geographical location to another geographical location. This information can be in form of voice, video, and data, which have been commonly termed as "multi-media." Information transmitted over the internet or internet "traffic" has increased dramatically in recent years. In fact, the increased traffic has caused congestion, which leads to problems in responsiveness and throughput. This congestion is similar to the congestion of automobiles on a freeway. As a result, individual users, businesses and others have been spending more time waiting for information, and less time on productive activities. Additionally, information being sent from one site to another through electronic mail, may not reach its destination in a timely or adequate matter. In effect, Quality of Service ("QoS") of the internet has decreased to the point where some messages are being read at some time significantly beyond the time the messages were sent.

The quality of service is often measured by responsiveness, including the amount of time spent waiting for images, texts, and other data to be transferred, and by throughput of data across the internet, and the like. Three main sources of data latency include: 1) the lack of bandwidth at the user (or receiving) end; 2) the general congestion of internet; and 3) the lack of bandwidth at the source (or sending).

The wide-spread growth of the internet can be attributed to the use of standard network protocols in routers, which couple different networks together. A typical network protocol, such as TCP/IP, includes an application layer, a host-to-host protocol layer (TCP/UDP), an internet protocol layer (IP) which is a network protocol and a physical layer. Often, routers are used to forward packets from different networks at the physical layer and the network layer.

Figure 1:
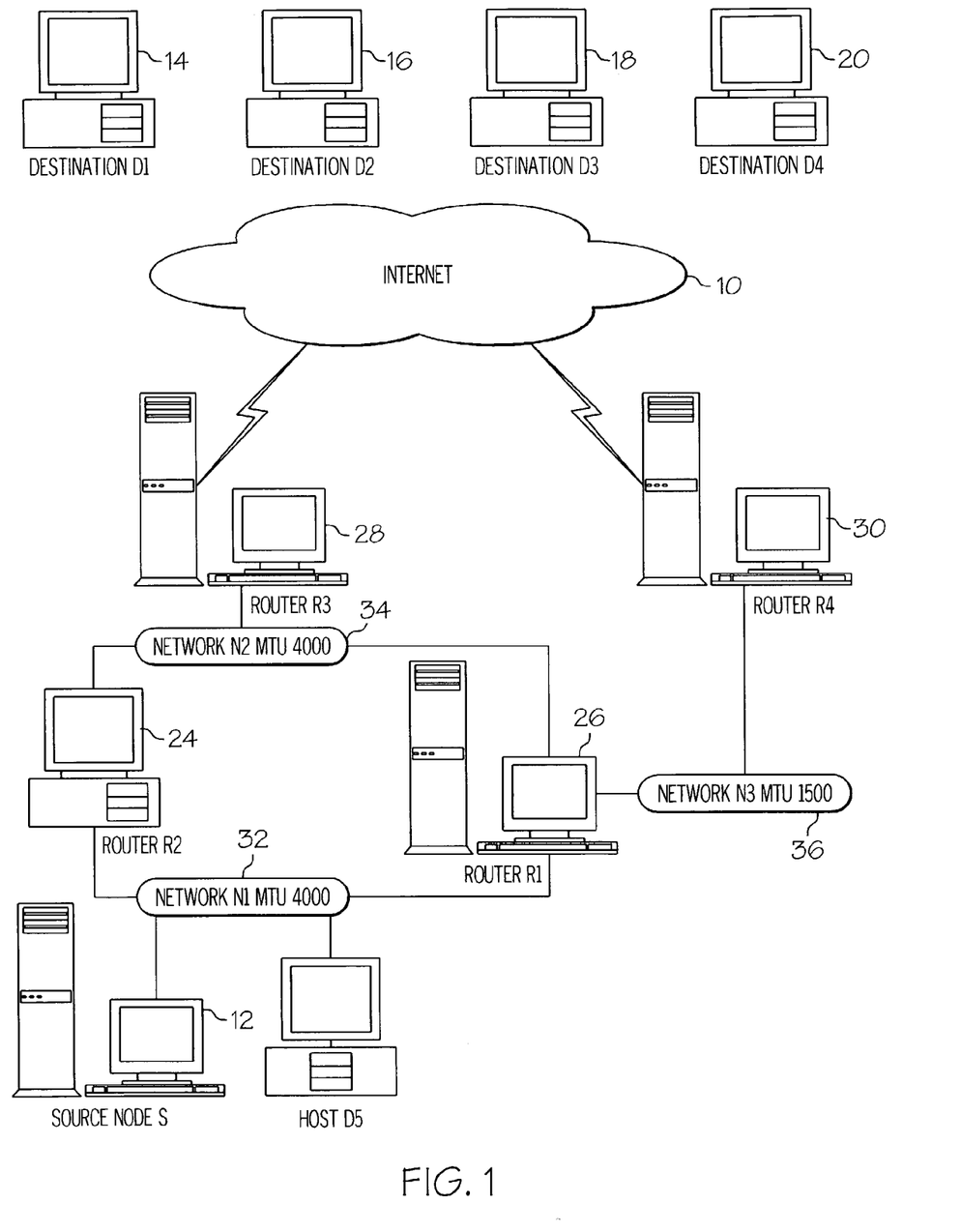
FIG. 1 is a schematic illustration of an exemplary computer network for practicing one embodiment of the present invention.

Referring to FIG. 1, depicted therein is a network-wide view of the typical system for communicating across the internet (10), between a local source node (12), and a target system (14) in the form of data packets sent over the internet. It has long been known that fragmentation of such data packets by routers (24, 26, 28, and 30) is generally undesirable. The reason is that such fragmentation and reassembly is an expensive and time-consuming process which causes applications to wait until all fragments are received and reassembled. Thus, it is desirable to determine a larger size packet which may be transmitted without being fragmented.

Maximum transmission unit (MTU) of a network interface is defined as the maximum size of a packet that can be sent out over the network interfaces (32, 34, and 36). In addition, the internet (10) is comprised of many networks with different MTUs. Internet traffic usually undergoes fragmentation at the source node and reassembly at the receiving node if the size of the data packet is larger than the MTU of the outgoing interface, or the interface of an intermediate router (24, 26, 28, 30). However, such fragmentation reassembly is a time-consuming and expensive process and causes applications to wait until all fragments are received and reassembled. It is possible to specify that Internet Protocol (IP) data not be fragmented however, this causes IP packets, which are larger than the MTUs, to be dropped.

Path MTU (PMTU) of an internet path is defined as the minimum of the MTUs of all the segments of the path it is comprised of. Restated, PMTU is the maximum size of data packet that can be passed through all the lengths without fragmentation between a given source and a destination. Data fragmentation and reassembly can be avoided if the PMTU of the internet path between the source and the destination was known. The IETF (Internet Engineering Task Force), which has assumed responsibility for the continued development of the internet, has published a "request for comment" or RFC 1191, which describes a technique for discovering PMTUs of internet paths by utilizing the "don't fragment" (DF) bit in the IP header to discover the PMTU. RFC 1191 describes the technique for discovering PMTUs of internet paths for IP version 4 (IPv4). Setting this DF option in the outgoing data (payload) IP packet enables the sending node to receive an error when the IP packet cannot be sent out because it is larger than the MTU of the outgoing interface and, as a result, the data packet is dropped. The source host (12) initially assumes the PMTU of the path is the known MTU of the first hop (32), and sends all packets with the DF bit set. If any of the routers (24, 26, 28, and 30) cannot forward the data packets without fragmentation, the particular router will discard them and return a "Destination Unreachable DF Set and Fragmentation Required" (Need-frag Error) ICMP message and the source host reduces its assumed PMTU. The PMTU discovery process ends when data packets are delivered without error, or the host may elect to end discovery process by ceasing to set the DF bit.

RFC 1981 describes the technique for discovering PMTUs of internet paths for IP version 6 (IPv6). For path MTU discovery for IPv6, the source node initially assumes that the PMTU is the known MTU of the first hop in the path. If a packet sent on that path is too large to be forwarded by some node along the path, that node will discard the packet and return an ICMP IPv6 "Packet Too Big" error message. Upon receipt of such message, the source node reduces its assumed PMTU for the path based on the MTU of the constricting hop as reported in the "Packet Too Big" error message. The path MTU discovery process ends when the node's estimate of the PMTU is less than or equal to the actual PMTU. Several iterations of the packet-sent/Packet-Too-Big-message-receive cycles may occur before the path MTU discovery process ends, as there may be links with smaller MTUs further along the path.

The PMTU may change over time, due to changes in routing topology. Reductions of the PMTU are detected by "Packet Too Big" error messages. To detect increases in the path PMTU, a node periodically increases its learned path MTU (LPMTU). This will almost always result in packets being discarded and "Packet Too Big" error messages being generated, because in most cases, the PMTU of the path will not have changed. Therefore, attempts to detect increases in the path's PMTU should be done infrequently. The probing is costly, because probing is done on a per destination basis and probes of size greater than the LPMTU are used. RFC 1981 defines a mechanism that probes are sent once every five or ten minutes so as to reduce the cost. A source node, which is a proxy server or web server, can be originating connections to as many as 4,000 other nodes on the internet. In order to detect increases in PMTU information for all 4,000 nodes, the source will have to send out 4,000 probe packets to each of the destinations every five or ten minutes. This leads to unnecessary wastage of bandwidth and processor cycles. In the worst case, this could result in a flood of error messages from intermediate routers.

If PMTU increments are not tracked by sending probes, the LPMTU will keep on decreasing until it reaches the protocol defined the minimal link MTU (576 for IPv4, 1280 for IPv6). This results in sub-optimal utilization of the path. As an example, if the LPMTU is one-half of the PMTU, then for sending out data of size three-quarters of PMTU, two packets are needed, whereas, in reality, one would be sufficient. Alternatively, periodically setting the LPMTU to the possible maximum, which is the directly connected link MTU, will create bursts of error messages, if the currently set LPMTU is higher than the actual PMTU.

While packet drops and data loss were not major issues for early traditional internet applications, such as mail, FTP, telnet, etc., they can cause serious quality of service (QoS) problems for applications involving multi-media data, such as audio and video teleconferencing, video serving, etc. Data packet drops must be kept to a minimum for such applications, as they involve real-time, data encoding and, hence, retransmission of a lost or dropped packet may simply not be an option. Therefore, specifying not to fragment IP data may not be useful for multi-media data if there is a need to avoid fragmentation and reassembly for performance reasons. As such, existing PMTU discovery processes are ill-suited to dynamically detect the increments in PMTU due to the aforementioned route changes.

SUMMARY OF THE INVENTION

A method and mechanism for selective probing to detect increases in path maximum transmission unit (PMTU). The method and mechanism filter out destinations which do not make use of the full PMTU and avoid transmitting PMTU probes for such destination. PMTU is treated as a resource which can be fully utilized or partially utilized by a node communicating with several other nodes.

One embodiment of the present invention is the method for determining when to transmit a probe packet to detect increases in path maximum transmission unit (PMTU) in a network having a host system and a target system interconnected by the network. A utility variable is calculated, wherein the utility variable corresponds to a number of packets to be transmitted from the host system to the target system which are greater than a predetermined amount of a known PMTU for the target system. When the utility variable is greater than a pre-determined utility threshold, instructions are sent to the host system to send a probe packet to detect increases in PMTU for the target system.

Another embodiment of the present invention is a method for determining when to transmit a probe packet to detect increases in path maximum transmission unit (PMTU) in a network having a host system and a target system interconnected by the network. A first timer is started and a learned path maximum transmission unit (LPMTU) and a previous path maximum transmission unit (PPMTU) corresponding to a route to the target system is retrieved from a destination cache. The size of each packet to be transmitted from the host system to the target system is compared with the LPMTU for the target system. A per destination count is maintained for the number of packets exceeding a threshold packet size, transmitted to this particular destination. When the count exceeds a pre-determined action level, a status flag in the destination cache, corresponding to the target system, is set to PROBE. When the first timer reaches a pre-determined event time, the destination cache is examined for status flags set to PROBE, and for each status flag set to PROBE, a probe packet is transmitted to the corresponding target system, and the count is reset to zero and a second timer is started. When an error message relating to the probe packet is received, and the error message contains a suggested maximum transmission unit (NEWMTU), the PPMTU in the destination cache is set to the LPMTU, the status flag is set to ACTIVE, and the LPMTU is set to the NEWMTU for the corresponding target system, and the count is reset to zero and the second timer is terminated. When the second timer reaches a pre-determined timeout level, the PPMTU in the destination cache is set to the LPMTU, the status flag is set to ACTIVE, and the LPMTU is set to the size of the PROBE packet for the corresponding target system, and the count is reset to zero, and the second timer is terminated.

Another embodiment of the present invention is a computer data signal embodied in the carrier wave and representing sequences of instructions which, when executed by a processor, determine when to transmit a probe to detect increases in path maximum transmission unit (PMTU) in a network having a host system and a target system interconnected by the network. The sequence of instructions calculate a utility variable corresponding to a number of packets to be transmitted from the host system to the target system which are greater than the pre-determined amount of a known PMTU for the target system. When the utility variable is greater than the pre-determined utility threshold, instructions are sent to the host system to send a probe to detect increases in PMTU for the target system.

Another embodiment of the present invention is a computer program product, comprising a computer useable medium having computer readable code embodied therein and capable of determining when to transmit a probe to detect increases in path maximum transmission unit (PMTU) in a network having a host system and a target system interconnected by the network. The computer useable medium has a code portion configured to calculate a utility variable corresponding to a number of packets to be transmitted from the host system to the target system, which are greater than a pre-determined amount of a known PMTU for the target system. The computer useable medium further comprises a code portion configured to send instructions to the host system to send a probe to detect increases in the PMTU for the target system, when the utility variable is greater than a pre-determined utility threshold.

Another embodiment of the present invention is a computer data signal embodied in a carrier wave and representing sequences of instructions which, when executed by a processor, determine when to transmit a probe to detect increases in path maximum transmission unit (PMTU) in the network having a host system and a target system interconnected by the network. The sequence of instructions comprise starting a first timer. A learned path maximum transmission unit (LPMTU) and a previous path maximum transmission unit (PTMTU) corresponding to a route to the target system is retrieved from a destination cache. The size of each packet to be transmitted from the host system to the target system is compared with the LPMTU for the target system. A count is maintained of the amount of packets exceeding a threshold packet size. When the count exceeds a pre-determined action level, a status flag in the destination cache corresponding to the target system is set to PROBE. When the first timer reaches a pre-determined event time, the destination cache is examined for status flags set to PROBE, and for each status flag set to PROBE, a probe packet is transmitted to the corresponding target system, and the count is reset to zero and a second timer is started. When an error message relating to the probe packet is received, and when the error message contains a suggested maximum transmission unit (NEWMTU), the PPMTU in the destination cache is set to the LPMTU, the status flag is set to ACTIVE, and the LPMTU is set to the NEWMTU for the corresponding target system, and the count is reset to zero and the second timer is terminated. When the second timer reaches a pre-determined timeout level, the PPMTU in the destination cache is set to the LPMTU, the status flag is set to ACTIVE and the LPMTU is set to the size of the probe packet for the corresponding target system, and the count is reset to zero and the second timer is terminated.

Another embodiment of the present invention is a mechanism configured to determine when to transmit a probe packet to detect increases in path maximum transmission unit (PMTU) in a network having a host system and a target system interconnected by the network. A mechanism is configured to start a first timer. A mechanism is configured to retrieve from a destination cache: a learned path maximum transmission unit (LPMTU) and a previous path maximum transmission unit (PPMTU) corresponding to a route to the target system. A mechanism is configured to compare a size of each packet to be transmitted from the host system to the target system with the LPMTU for the target system. A mechanism is configured to set in the destination cache, a status flag corresponding to the target system to PROBE when the count exceeds a pre-determined action level. A mechanism is configured to examine the destination cache for a status flag set to PROBE, when the first timer reaches a pre-determined event time and wherein the mechanism is further configured to transmit a packet probe to the corresponding target system for each status flag set to PROBE, reset the count to zero, and start a second timer. A mechanism is configured to set the PPMTU to the LPMTU, when an error message containing a suggested maximum transmission unit (NEWMTU) is received, and wherein the mechanism is further configured to set the status flag corresponding to the target system to ACTIVE, set the LPMTU to the NEWMTU, and reset the count to zero and terminate the second timer. When the second timer reaches a pre-determined timeout level, the mechanism is configured to set the PPMTU to the LPMTU, to set the status flag to ACTIVE and the LPMTU to the size of the PROBE packet for the corresponding target system, and reset the count to zero and terminate the second timer.

Another embodiment of the present invention is a method for optimizing path maximum transmission unit (PMTU) in a network having a host system and a target system interconnected by the network, wherein the target system is temporarily unreachable. A learned path maximum transmission unit (LPMTU) and previous path maximum transmission unit (PPMTU) corresponding to the target system are retrieved from a destination cache. When the target system becomes reachable, the LPMTU is set to the PPMTU provided the condition LPMTU<PPMTU<Immediately Connected link MTU is satisfied. Otherwise the immediately connected link MTU is used.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

The embodiments set forth in the drawings are illustrative in nature and are not intended to be limiting of the invention defined by the claims. Moreover, individual features of the drawings and the invention will be more fully apparent and understood in view of the detailed description.

DETAILED DESCRIPTION

Terms Used in this Application:

MTU=Maximum Transmission Unit

PMTU=Path MTU.

PPMTU=Previous Path MTU. The previous value of PMTU to a destination, which is greater than the current value.

LPMTU=Learned PMTU. The value of PMTU currently known to a source.

NEWMTU=New MTU information received in a Packet Too Big error message

CE=Cache Entry. This is also known in normal implementations as the Destination Cache Entry or Route Cache Entry. This has the complete information required for reaching a destination including the first hop router MAC address.

CE has the following flags:

STALE=CE is in a non usable state or a suspected problem state.

ACTIVE=The destination in the cache entry has a valid PMTU

PROBE=A probe packet was sent to the CE destination and this is sub state of the ACTIVE State In the CE, <STALE, ACTIVE, PROBE> are represented as <S, A, P>

UCOUNT=Utility Counter. The number of packets sent to a destination exceeding the threshold packet size. For example, the number of packets exceeding the size of 87.5% of LPMTU.

UCOUNTTHR=Utility Counter Threshold. The maximum value of UCOUNT beyond which CE's destination will be considered for sending out a probe packet.

Reference will now be made in detail to various embodiments of the invention, examples of which are illustrated in the accompanying drawings, wherein like numerals indicate similar elements throughout the views.

Figure 2:
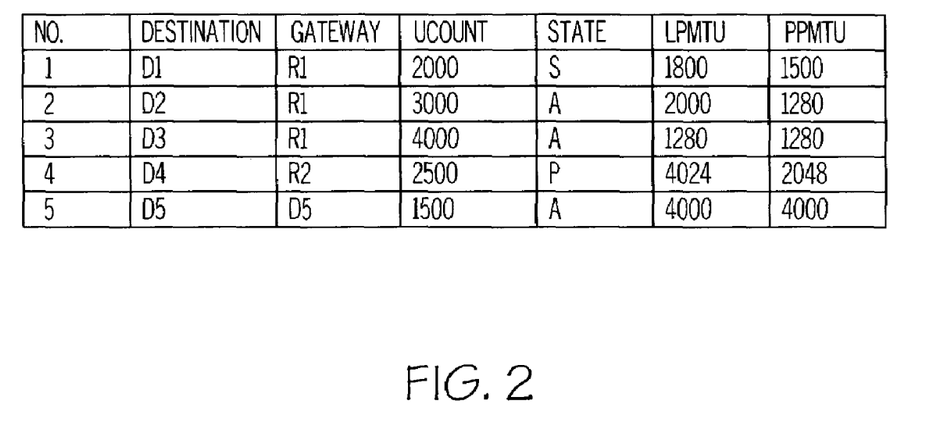
FIG. 2 is an illustration depicting the contents of an exemplary destination cache for practicing one embodiment of the present invention.

FIG. 1 illustrates an exemplary computer network for practicing one embodiment of the present invention. In this example, the local system (12) calculates a utility variable corresponding to the number of packets to be transmitted from the host system (12) to the target system (14), which are greater than the pre-determined amount of a known PMTU for the target system. When the utility variable is greater than the pre-determined utility threshold, instructions are sent to the host system to send a probe packet to detect increases in PMTU for the target system. In one exemplary embodiment, calculating the utility variable comprises retrieving from a destination cache, as illustrated in FIG. 2, a learned path maximum transmission unit (LPMTU) and previous path maximum transmission unit (PPMTU) corresponding to a route to the target system. The destination cache, or also known as the route cache, contains an entry for each destination. The host system compares the size of each packet to be transmitted from the host system to the target system with the LPMTU for the target system, and for each packet exceeding a threshold packet size, increments the utility variable. The threshold packet size is a pre-determined value, which the host system operator or other user controlling the operations of the internet services of the host, can set. In one exemplary embodiment, the threshold packet size is 50% of the LPMTU. In another embodiment, the threshold packet size is 87.5% of the LPMTU. The reason behind using a threshold such as 87.5% because this margin allows if the upper layer applications decide to do packet size optimizations, this will give a valid range of full utilization and is easy to calculate. The utility variable (UCOUNT) represents the number of times a particular destination LPMTU is almost fully utilized. If this exceeds a utility threshold (UCOUNTHR) the destination cache entry is marked to send probe.

When the utility variable is greater than the pre-determined utility threshold, instructions are sent to the host system to send a probe packet to determine increases in PMTU for the target system. For example, when the utility variable, UCOUNT as designated in the destination cache of FIG. 2, is greater than a pre-determined utility threshold, UCOUNTHR, instructions are sent to the host system to send a probe packet to detect increases in PMTU for the target system. The pre-determined utility threshold, UCOUNTHR, is set by the system operator or another user having administration rights to the network services. In one embodiment, when a probe packet is sent to the target system, the utility variable, UCOUNT, is reset to zero.

If an error message relating to a probe packet is received, such as an ICMP "Packet Too Big" error message, the PPMTU in the destination cache is set to the value of the current LPMTU, and the LPMTU is set to the suggested maximum transmission unit (NEWMTU) contained in the "Packet Too Big" error message for the corresponding target system. When a pre-defined time period has elapsed and no error messages relating to the probe packet is received, the PPMTU in the destination cache is set to the current value of the LMPTU, and the LMPTU is set to the size of the probe packet for the corresponding target system. In one exemplary embodiment, the pre-defined time period ranges from 30 seconds to one minute.

When the utility variable exceeds the pre-determined utility threshold, and when the PPMTU in the destination cache for the corresponding system is greater than the LPMTU, the size of the probe packet to be transmitted is equal to the PPMTU. When the utility variable exceeds the pre-determined utility threshold, and when the PPMTU is less than or equal to the LPMTU, the size of the PROBE packet is equal to the link MTU of the directly connected link.

In one embodiment, the pre-determined utility threshold may be pre-defined in a lookup table corresponding to the anticipated server activity. For example, if the server is sending multi-media streaming data, the pre-determined utility threshold may be lower than a setting for a standard data server in which real time delivery of the packets is not as critical. In one embodiment, the LPMTU is changed for a corresponding target system in the destination cache, the utility variable, UCOUNT, is reset to zero.

Figure 3A:
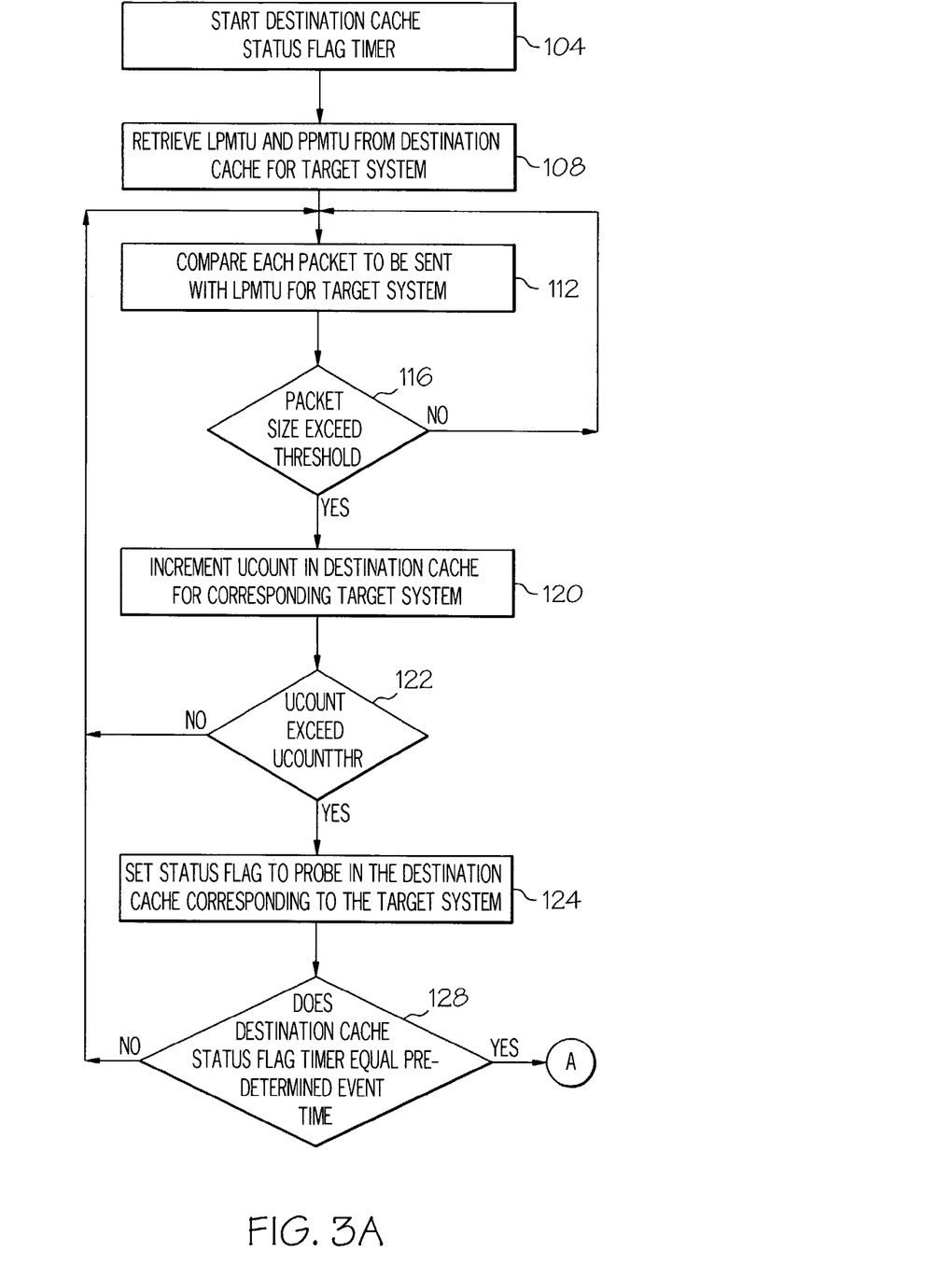
FIGS. 3A and 3B are flow diagrams of the PMTU discovery method according to an embodiment of the present invention.
Figure 3B:
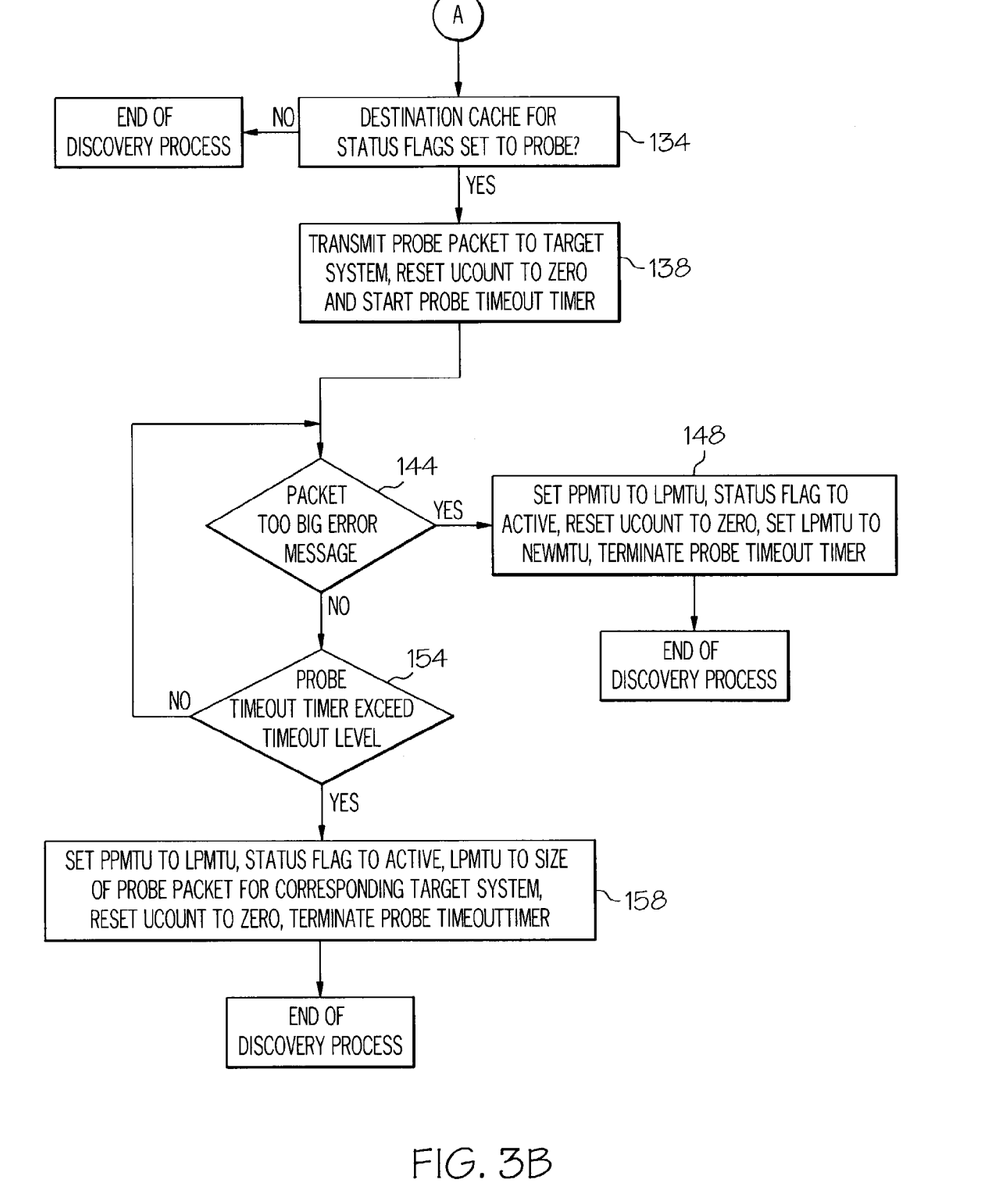

Another embodiment of the present invention is illustrated in the flowcharts of FIG. 3 and comprises a method for determining when to transmit a probe packet to detect increases in path maximum transmission unit (PMTU) in a network having a host system and a target system interconnected by the network. The method comprises: starting a destination cache status flag timer (104) and retrieving from the destination cache: a learned path maximum transmission unit (LPMTU) and a previous path maximum transmission unit (PPMTU) corresponding to the target system (108). Each packet to be transmitted from the host system to the target system is compared with the LPMTU for the target system (112). If the size of the packet exceeds the threshold (116), the utility variable, UCOUNT, is increased by one in the destination cache for the corresponding target system (120). When UCOUNT exceeds a predetermined action level, UCOUNTHR(122), the status flag in the destination cache corresponding to the target system is set to PROBE (124).

Figure 4A:
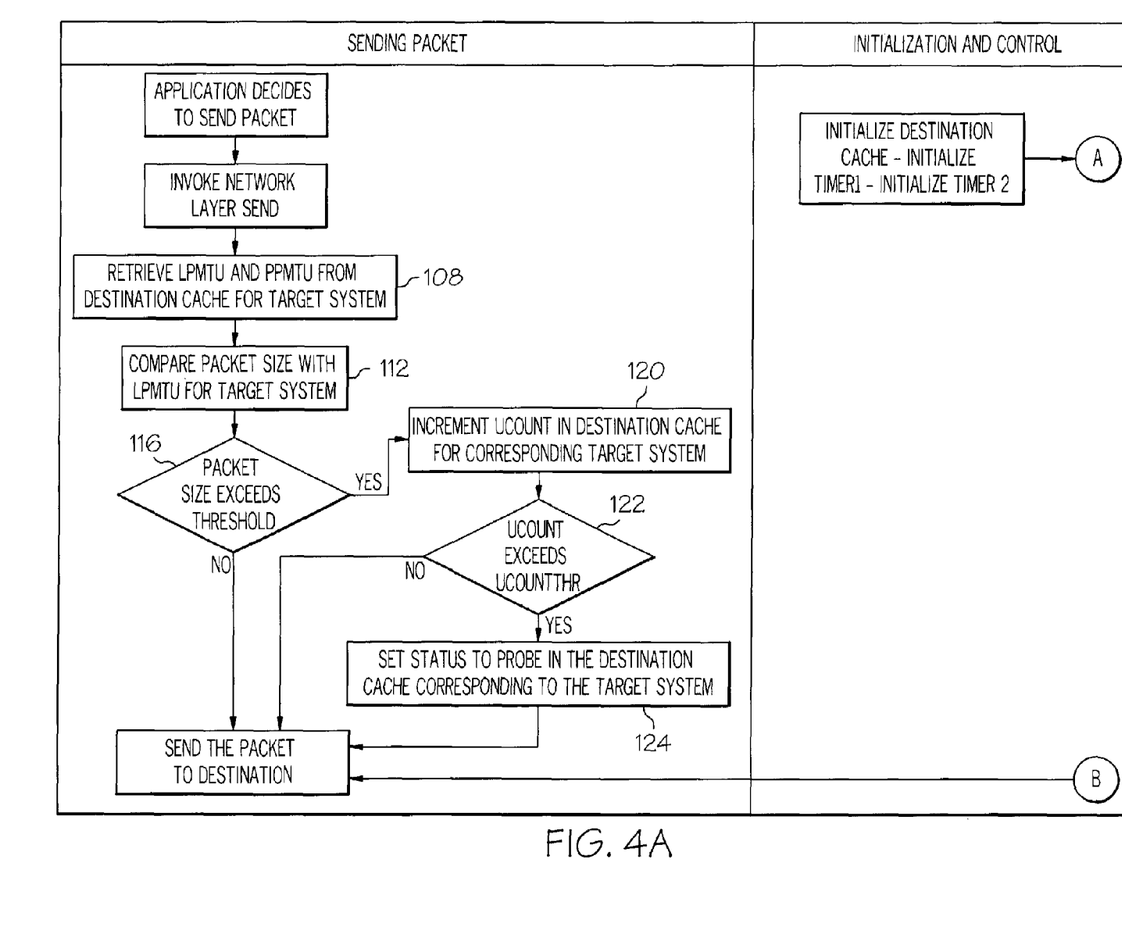
FIG. 4 is a flow diagram of an exemplary PMTU discovery method according to an embodiment of the present invention.
Figure 4B:
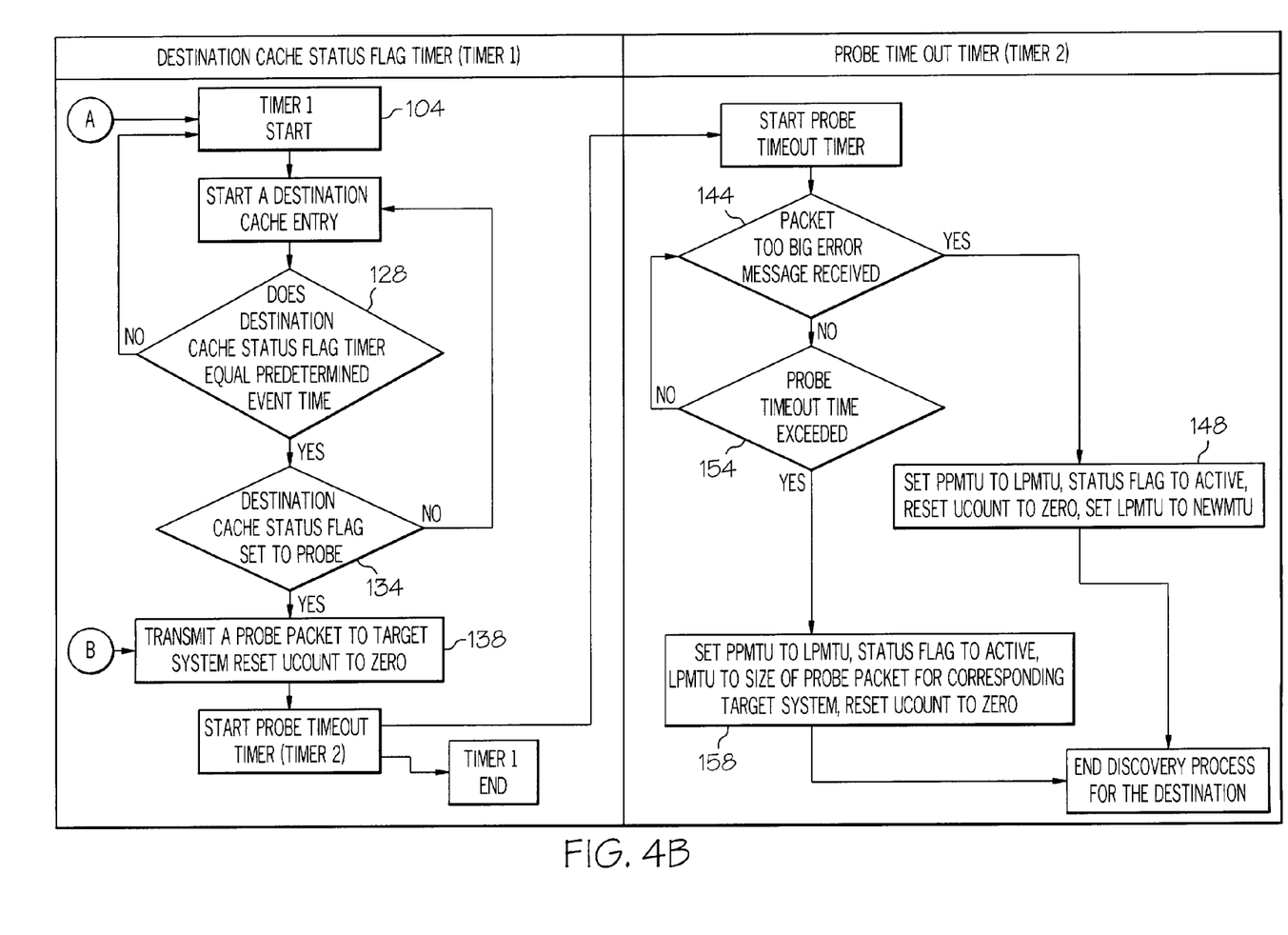

When the destination cache status flag timer reaches a predetermined event time (128), the destination cache is examined for status flags set to PROBE for corresponding target systems (134). If the status flag in the destination cache is set to PROBE, a probe packet is transmitted to the corresponding target system and the utility variable, UCOUNT, is reset to zero and a probe timeout timer is initiated (138). If an error message relating to the probe packet is received, such as "Packet Too Big" error message and contains a suggested maximum transmission unit (NEWMTU) (144), the PPMTU is set to the value of the LPMTU, and the status flag is set to ACTIVE, UCOUNT is reset to zero and LPMTU is set to the NEWMTU and the second timer is terminated (148). If the probe timeout timer exceeds the predetermined timeout level (154), the PPMTU is set to the value of the LPMTU, the status flag is set to ACTIVE, and the LPMTU is set to the size of the probe packet for the corresponding target system, and UCOUNT is reset to zero and the probe timeout timer is terminated (158). An exemplary embodiment of the PMTU discovery process is depicted in FIG. 4 which highlights the parallel processing of the PMTU discovery process.

In a further embodiment, the method further comprises setting in the destination cache the status flag corresponding to the target system to STALE, if the target system becomes unreachable. When the target system becomes reachable and the status flag for the corresponding target system is set to STALE, the LPMTU is set to the value of the PPMTU and the status flag is set to ACTIVE for the corresponding target system and UCOUNT is reset to zero.

In one exemplary embodiment, the LPMTU value of the cache entry in the destination cache is tracked even if the state of the cache entry is moved to STALE state for the corresponding target system. If the cache entry is temporarily unavailable because of a neighbor discovery (ARP equivalent in IPv6) or temporarily becomes unreachable, the PMTU value is not discarded. In the prior art, if a target system had become stale, the LPMTU would be reset to the first hop MTU thereby rebuilding the cache. Under the present invention, the status flag is changed to STALE when a lower layer resolution is temporarily unavailable, but when the destination becomes available, the status flag is changed to ACTIVE and the LPMTU is established from the previous PPMTU.

EXAMPLE

The following example utilizes FIG. 1, wherein the source node (12) is in communication with destinations D1(14), D2(16), D3(18) and D4(20). As illustrated, these destinations are reachable via three alternative paths. Path 1 comprises router R2(24) and router R3(28). Path 2 comprises router R1(26) and router R4(30). Path 3 comprises router 1(26) and router 3(28). The initial known PMTU for Path 1=4000, for Path 2=1500 and for Path 3=4000.

A Telnet connection (C1) from the host system (12) to target system D1 (14) utilizes very small TCP packets of approximate size 75 bytes. Another connection (C2) between the host system (12) and target system D2(16) is established to transfer a large file over TCP which will use the maximum available MTU.

Timer 1 is initiated and an action alarm is set at 5 minutes for the timer. UCOUNTHR is set to 200. Timer 2 is initiated and an action alarm is set to every 30 seconds for the timer. To start transmission of the data packets, the LPMTU of D1 and D2 are set to 4000 which is the MTU of the first hop Network N1 (32).

At Time 00:00:00 Path=R1-R4

1 Packet of size 75 bytes sent to D1(14)

1 Packet of size 4000 bytes sent to D2 (16)

| No | Destination | Gateway | UCOUNT | STATE | LPMTU | PPMTU |
|---|---|---|---|---|---|---|
| 1 | D1 | R1 | 0 | A | 4000 | 4000 |
| 2 | D2 | R1 | 1 | A | 4000 | 4000 |

The router R(26) immediately sends a Packet Too Big Message with NEWMTU=1500. The bottleneck link is N3 (36) with MTU=1500.

At Time 00:00:01 Path=R1-R4 Packet Too Big Error Message is Received from R1 for D2 with NEWMTU 1500

The destination cache is updated: PPMTU set to LPMTU, LPMTU set to NEWMTU and UCOUNT is reset to zero for D2.

| No | Destination | Gateway | UCOUNT | STATE | LPMTU | PPMTU |
|---|---|---|---|---|---|---|
| 1 | D1 | R1 | 0 | A | 4000 | 4000 |
| 2 | D2 | R1 | 0 | A | 1500 | 4000 |

At Time 00:00:30 Path=R1-R4 Timer 2 Ticks

Since no CE entry was in PROBE "P" state, No action taken is initiated.

| No | Destination | Gateway | UCOUNT | STATE | LPMTU | PPMTU |
|---|---|---|---|---|---|---|
| 1 | D1 | R1 | 0 | A | 4000 | 4000 |
| 2 | D2 | R1 | 0 | A | 1500 | 4000 |

Assume the Network Policy Changes and the New Path is Via R1-R3

5000 Packets of size 75 bytes are sent to D1

1000 Packets of size 1500 are sent to D2

At Time 00:05:00 Path=R1-R3 Timer 1 Processing Start

| No | Destination | Gateway | UCOUNT | STATE | LPMTU | PPMTU |
|---|---|---|---|---|---|---|
| 1 | D1 | R1 | 0 | A | 4000 | 4000 |
| 2 | D2 | R1 | 1000 | A | 1500 | 4000 |

Now D2's UCOUNT>UCOUNTTHR and it qualifies for sending probe. So state is changed to PROBE "P" and UCOUNT is reset.

At Time 00:05:00 Path=R1-R3 Timer 1 Processing Ends

| No | Destination | Gateway | UCOUNT | STATE | LPMTU | PPMTU |
|---|---|---|---|---|---|---|
| 1 | D1 | R1 | 0 | A | 4000 | 4000 |
| 2 | D2 | R1 | 0 | AP | 1500 | 4000 |

Destination cache examined for entries with PROBE state. A probe for D2 with size 4000 is sent.

At Time 00:05:30 Path=R1-R3 Timer 2 Ticks

Since no Packet Too Big Error Messages received related to probe for D2, The PPMTU is set to the LPMTU. The LPMTU is set to the probe packet size of 4000. The PROBE "P" flag is removed from the state and UCOUNT is reset to zero.

| No | Destination | Gateway | UCOUNT | STATE | LPMTU | PPMTU |
|---|---|---|---|---|---|---|
| 1 | D1 | R1 | 0 | A | 4000 | 4000 |
| 2 | D2 | R1 | 0 | A | 4000 | 4000 |

At Time 00:06:00 Path=R1-R3 a Temporary Failure Happens and Gateway R1 is Detected to be Unreachable Status flags set to STALE for unreachable destination.

| No | Destination | Gateway | UCOUNT | STATE | LPMTU | PPMTU |
|---|---|---|---|---|---|---|
| 1 | D1 | R1 | 0 | S | 4000 | 4000 |
| 2 | D2 | R1 | 0 | S | 4000 | 4000 |

R2 takes over R1 for connectivity. So R2 becomes the gateway for D1 and D2

At Time 00:06:01 Path=R2–R3. R2 Takes Over R1's Role as the Default Router

| No | Destination | Gateway | UCOUNT | STATE | LPMTU | PPMTU |
|----|-------------|---------|--------|-------|-------|-------|
| 1  | D1          | R2      | 0      | S     | 4000  | 4000  |
| 2  | D2          | R2      | 0      | S     | 4000  | 4000  |

Since destination is now reachable, status flag set to ACTIVE "A" and LPMTU is set to PPMTU and UCOUNT is reset to zero.

1 Packet of 75 size bytes sent to D1

1 Packet of size 4000 bytes sent to D2

At Time 00:06:02 Path=R2–R3

| No | Destination | Gateway | UCOUNT | STATE | LPMTU | PPMTU |
|----|-------------|---------|--------|-------|-------|-------|
| 1  | D1          | R2      | 0      | A     | 4000  | 4000  |
| 2  | D2          | R2      | 1      | A     | 4000  | 4000  |

Note that the host never transmitted even a single probe packet to D1 because the utilization of the LPMTU by the host towards D1 was very low. On the other hand, D2 transmitted probes and detected the increases in PMTU.

The foregoing description of the various embodiments of the invention has been presented for the purposes of illustration and description. It is not intended to be exhaustive or to limit the invention to the precise form disclosed. Many alternatives, modifications and variations will be apparent to those skilled in the art of the above teaching. Accordingly, this invention is intended to brace all alternatives, modifications and variations that have been discussed herein, and others that fall within the spirit and broad scope of the claims.

What is claimed is:

1. A method for determining when to transmit a probe packet to detect increases in path maximum transmission unit (PMTU) in a network having a host system and a target system interconnected by the network, comprising:
   calculating a utility variable corresponding to a number of packets to be transmitted from the host system to the target system which are greater than a predetermined amount of a known PMTU for the target system, the calculating including retrieving from a destination cache, a learned path maximum transmission unit (LPMTU) and a previous path maximum transmission unit (PPMTU) corresponding to a route to the target system and comparing a size of each packet to be transmitted from the host system to the target system with the LPMTU for the target system, and for each packet exceeding a threshold packet size, incrementing the utility variable; and
   when the utility variable is greater than a predetermined utility threshold, sending instructions to the host system to send a probe packet to detect increases in PMTU for the target system.

2. The method of claim 1, further comprising resetting the utility variable to zero, when a probe packet is sent to the target system.

3. The method of claim 1, further comprising:
   when an error message relating to the probe packet is received and when the error message contains a suggested maximum transmission unit (NEWMTU) and when LPMTU<PPMTU<Immediately Connected link MTU, setting in the destination cache the PPMTU to the LPMTU, and setting the LPMTU to the NEWMTU for the corresponding target system.

4. The method of claim 1, further comprising:
   when a pre-defined time period has elapsed and when no error message relating to the probe packet is received, setting in the destination cache the PPMTU to the LMPTU and setting the LPMTU to the size of the probe packet for the corresponding target system.

5. The method of claim 1, further comprising:
   when the utility variable exceeds the predetermined utility threshold and when the PPMTU is greater than the LPMTU, the size of the probe packet is equal to the PPMTU.

6. The method of claim 1, further comprising:
   when the utility variable exceeds the predetermined utility threshold and when the PPMTU is less than or equal to the LPMTU, the size of the probe packet is equal to the link MTU of a directly connected link.

7. The method of claim 1, wherein the threshold packet size is configurable.

8. The method of claim 1, wherein the predetermined utility threshold is configurable.

9. The method of claim 1, further comprising resetting the utility variable to zero, when the LPMTU changes for the corresponding target system.

10. A method for determining when to transmit a probe packet to detect increases in path maximum transmission unit (PMTU) in a network having a host system and a target system interconnected by the network, comprising:
    starting a first timer;
    retrieving from a destination cache, a learned path maximum transmission unit (LPMTU) and a previous path maximum transmission unit (PPMTU) corresponding to a route to the target system;
    comparing a size of each packet to be transmitted from the host system to the target system with the LPMTU for the target system;
    maintaining a count of the amount of packets exceeding a threshold packet size;
    when the count exceeds a pre-determined action level, setting a status flag in the destination cache corresponding to the target system to PROBE;
    when the first timer reaches a pre-determined event time, examining the destination cache for status flags set to PROBE, and for each status flag set to PROBE transmitting a probe packet to the corresponding target system and resetting the count to zero and starting a second timer;
    when an error message relating to the probe packet is received and when the error message contains a suggested maximum transmission unit (NEWMTU), setting in the destination cache the PPMTU to the LPMTU, the status flag to ACTIVE, and the LPMTU to the NEWMTU for the corresponding target system, and resetting the count to zero and terminating the second timer; and when the second timer reaches a pre-determined timeout level, setting in the destination cache the PPMTU to the LPMTU, the status flag to ACTIVE, and the LPMTU to the size of the probe packet for the corresponding target system, and resetting the count to zero and terminating the second timer.

11. The method of claim 10, further comprising:
when the target system is unreachable, setting in the destination cache the status flag corresponding to the target system to STALE; and
when the target system is reachable and the status flag in the destination cache for the corresponding target system is set to STALE, setting the LPMTU to the PPMTU, and the status flag to ACTIVE for the corresponding target system, and resetting the count to zero.

12. The method of claim 10, wherein the threshold packet size is configurable.

13. The method of claim 10, wherein the predetermined action level is configurable.

14. A computer program product, comprising:
a computer usable medium having computer readable code embodied therein capable of determining when to transmit a probe to detect increases in path maximum transmission unit (PMTU) in a network having a host system and a target system interconnected by a network, comprising:
a first code portion configured to calculate a utility variable corresponding to a number of packets to be transmitted from the host system to the target system which are greater than a predetermined amount of a known PMTU for the target system, the first code portion configured to retrieve from a destination cache, a learned path maximum transmission unit (LPMTU) and a previous path maximum transmission unit (PPMTU) corresponding to a route to the target system and to compare a size of each packet to be transmitted from the host system to the target system with the LPMTU for the target system; and
a second code portion configured to send instructions to the host system to send a probe to detect increases in PMTU for the target system, when the utility variable is greater than a predetermined utility threshold.

15. A mechanism configured to determine when to transmit a probe packet to detect increases in path maximum transmission unit (PMTU) in a network having a host system and a target system interconnected by the network, comprising:
a mechanism configured to start a first timer;
a mechanism configured to retrieve from a destination cache, a learned path maximum transmission unit (LPMTU) and a previous path maximum transmission unit (PPMTU) corresponding to a route to the target system;
a mechanism configured to compare a size of each packet to be transmitted from the host system to the target system with the LPMTU for the target system;
a mechanism configured to set in the destination cache a status flag corresponding to the target system to PROBE, when the count exceeds a pre-determined action level;
a mechanism configured to examine the destination cache for status flags set to PROBE, when the first timer reaches a pre-determined event time, and wherein the mechanism is further configured to transmit a packet probe to the corresponding target system for each status flag set to PROBE, reset the count to zero and start a second timer;
a mechanism configured to set the PPMTU to the LPMTU, when an error message containing a suggested maximum transmission unit (NEWMTU), and wherein the mechanism is further configured to set the status flag corresponding to the target system to ACTIVE, set the LPMTU to the NEWMTU, and reset the count to zero and terminate the second timer; and
a mechanism configured to set the PPMTU to the LPMTU, when the second timer reaches a pre-determined timeout level, and wherein the mechanism is further configured to set the status flag to ACTIVE and the LPMTU to the size of the probe packet for the corresponding target system, and reset the count to zero and terminate the second timer.

16. The mechanism of claim 15, further comprising:
a mechanism to set the status flag corresponding to the target system to STALE, when the target system becomes unreachable; and
a mechanism to set the LPMTU to the PPMTU, when the target system is reachable and when the status flag is set to STALE, and wherein the mechanism is further configured to set the status flag for the corresponding target system to ACTIVE and reset the count to zero.

17. A method for optimizing path maximum transmission unit (PMTU) in a network having a host system and a target system interconnected by a network, wherein the target system is temporarily unreachable, comprising:
calculating a utility variable corresponding to a number of packets to be transmitted from the host system to the target system which are greater than a predetermined amount of a known PMTU for the target system, the calculating including retrieving from a destination cache, a learned path maximum transmission unit (LPMTU) and a previous path maximum transmission unit (PPMTU) corresponding to a route to the target system and comparing a size of each packet to be transmitted from the host system to the target system with the LPMTU for the target system and for each packet exceeding a threshold packet size, incrementing the utility variable; and
when the target system becomes reachable, setting the LPMTU to the PPMTU.

18. The method of claim 17, further including
transmitting a probe packet to the target system, wherein the probe packet is the size of the PPMTU.

* * * * *